(12) United States Patent
Jayaram et al.

(10) Patent No.: US 10,077,730 B2
(45) Date of Patent: Sep. 18, 2018

(54) SYSTEM FOR MONITORING A PRECHAMBER OF AN ENGINE

(71) Applicant: General Electric Company, Schenectady, NY (US)

(72) Inventors: Rajesh Kumar Jayaram, Bangalore (IN); Amit Shrivastava, Bangalore (IN); Chandan Kumar, Bangalore (IN); Pavan Chakravarthy Nandigama, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 76 days.

(21) Appl. No.: 14/985,899

(22) Filed: Dec. 31, 2015

(65) Prior Publication Data

US 2017/0191439 A1    Jul. 6, 2017

(51) Int. Cl.
| | | |
|---|---|---|
| *F02B 19/00* | (2006.01) | |
| *F02D 41/14* | (2006.01) | |
| *F02B 19/10* | (2006.01) | |
| *F02B 77/08* | (2006.01) | |
| *F02D 35/02* | (2006.01) | |
| *F02D 41/22* | (2006.01) | |
| *F02P 17/12* | (2006.01) | |
| *F02D 41/04* | (2006.01) | |

(52) U.S. Cl.
CPC ...... *F02D 41/1446* (2013.01); *F02B 19/1095* (2013.01); *F02B 77/085* (2013.01); *F02D 35/023* (2013.01); *F02D 35/027* (2013.01); *F02D 41/221* (2013.01); *F02D 41/042* (2013.01); *F02D 2200/1002* (2013.01); *F02P 2017/121* (2013.01); *Y02T 10/125* (2013.01)

(58) Field of Classification Search
CPC ............ F02D 41/2487; F02D 41/1446; F02D 35/023; F02D 35/027; F02B 19/1095; F02B 19/1047; F02B 19/1052; F02B 19/1085; F02B 77/085; F02P 17/12
USPC .................................................. 123/261–293
See application file for complete search history.

(56) References Cited

U.S. PATENT DOCUMENTS 3,824,965 A * 7/1974 Clawson ............. F02B 19/1085
                                                    123/275
4,829,956 A * 5/1989 Rehn ..................... F02D 35/027
                                                    123/198 DB

(Continued)

*Primary Examiner* — Hai Huynh
*Assistant Examiner* — Gonzalo Laguarda
(74) *Attorney, Agent, or Firm* — Fletcher Yoder, P.C.

(57) ABSTRACT

The present disclosure includes systems and methods for monitoring a prechamber of an engine. In one embodiment, a system includes a combustion engine having a combustion chamber and a prechamber, where the prechamber is configured to direct a flame toward the combustion chamber, a fuel supply valve configured to adjust a flow of a fuel toward the prechamber, a prechamber valve configured to receive the fuel into the prechamber, a knock sensor coupled to the combustion engine, and a controller. The controller is configured to control operations of the combustion engine, to receive a signal from the knock sensor, to determine a combustion parameter based at least on the signal, to determine a condition of one or both of the prechamber and the prechamber valve based at least on the combustion parameter, and to adjust the fuel supply valve based at least on the condition.

16 Claims, 4 Drawing Sheets

(56) References Cited

U.S. PATENT DOCUMENTS 5,887,566 A * 3/1999 Glauber ............... F02D 19/105
                                                     123/27 GE
9,506,411 B2 * 11/2016 Glugla ............... F02D 41/0087

* cited by examiner

SYSTEM FOR MONITORING A PRECHAMBER OF AN ENGINE

BACKGROUND

The subject matter disclosed herein relates to a system and method for monitoring a prechamber of an internal combustion engine.

Combustion engines typically combust a carbonaceous fuel, such as natural gas, gasoline, diesel, and the like, and use the corresponding expansion of high temperature and pressure gases to apply a force to certain components of the engine (e.g., piston disposed in a cylinder) to move the components over a distance. Ultimately, the components of the engine power a load. Additionally, a combustion engine may include a prechamber that receives a fuel via a prechamber valve. The prechamber may direct ignited fuel into a combustion chamber to facilitate mixing and combustion. In some cases, the prechamber receives a fuel that may include contaminants such as dirt particles, water droplets, and the like. Accordingly, ignition within the prechamber may be less effective when such contaminants are present within the fuel. Therefore, it is now recognized that it may be desirable to monitor a condition of the prechamber in real-time.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a combustion engine having a combustion chamber and a prechamber, where the prechamber is configured to direct a flame toward the combustion chamber, a fuel supply valve configured to adjust a flow of a fuel toward the prechamber, a prechamber valve configured to receive the fuel into the prechamber, a knock sensor coupled to the combustion engine, and a controller communicatively coupled to the combustion engine, the prechamber, and the knock sensor. The controller is configured to control operations of the combustion engine, to receive a signal from the knock sensor, to determine a combustion parameter based at least on the signal, to determine a condition of the prechamber valve based at least on the combustion parameter, and to adjust the fuel supply valve based at least on the combustion parameter, the condition of the prechamber valve, or both.

In another embodiment, a system includes a controller that includes a processor and a memory, where the processor is configured to execute instructions stored on the memory. The instructions include receiving data from a knock sensor, where the knock sensor is coupled to a combustion engine, determining a value of an operating condition of the combustion engine based at least on the data, determining whether the value of the operating condition is outside of a predetermined range, adjusting a flow of fuel directed toward a prechamber of the combustion engine via a fuel supply valve when the value is outside of the predetermined range, where the prechamber is configured to direct a flame toward a combustion chamber of the combustion engine, and outputting a signal to shutdown the combustion engine when the value is outside of the predetermined range and above a threshold.

In another embodiment, a method includes utilizing a controller to receive data from a knock sensor, where the knock sensor is coupled to a combustion engine, determine a value of an operating condition of the combustion engine based at least on the data, determine whether the value of the operating condition is outside of a predetermined range, adjust a flow of fuel directed toward a prechamber of the combustion engine via a fuel supply valve when the value is outside of the predetermined range, where the prechamber is configured to direct a flame toward a combustion chamber of the combustion engine, and output a signal to shutdown the combustion engine when the value is outside of the predetermined range and above a threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed embodiments relate to a system for monitoring a prechamber in a combustion engine. A prechamber may be a compartment separate from a combustion chamber in the combustion engine that directs ignited fuel into the combustion chamber. For example, the prechamber may receive a fuel (e.g., via a fuel supply and a prechamber valve) and combust the fuel to generate a flame via a spark introduced from a spark plug or heat generated by a glow plug. The ignited fuel in the prechamber may be directed toward a combustion chamber in the combustion engine to facilitate combustion and drive a load powered by the combustion engine. The prechamber may facilitate mixing within the combustion chamber (e.g., between the fuel and an oxidant such as air) as a result of the relatively high pressure of the ignited fuel. Additionally, the prechamber may facilitate combustion within the combustion chamber because the ignited fuel may assist in ignition of a fuel and oxidant mixture within the combustion chamber (e.g., via a flame, or relatively high temperature).

In some cases, the fuel injected into the prechamber may contain contaminants (e.g., dirt and/or water) or include a concentration (e.g., too rich or too dilute) that may decrease an effectiveness of the prechamber. For example, when the fuel received by the prechamber includes contaminants or otherwise has a low concentration (e.g., a higher proportion of oxidant), the fuel may clog a prechamber valve (e.g., a valve enabling gas or fuel to enter the prechamber, but not exit the prechamber), which may affect combustion in the combustion chamber. Combustion in the combustion chamber depends on a timing (e.g., ignition timing) to enhance efficiency of the combustion engine, and such timing may be affected when the prechamber valve is clogged. For example, to enhance combustion efficiency, a flame may be introduced into the combustion chamber when a piston reaches bottom dead center (e.g., when the piston is at its lowest position with respect to a cylinder in the combustion engine). However, a flame from a prechamber with a clogged prechamber valve may be introduced at a timing when the piston is not at bottom dead center, which may decrease combustion efficiency. Therefore, it is now recognized that monitoring the prechamber may be desirable to detect issues associated with the prechamber and/or the prechamber valve such that combustion efficiency may be enhanced.

In accordance with the present disclosure, an amount of fuel directed toward the prechamber may be adjusted (e.g., by a controller or engine control unit) to address detected issues associated with the prechamber. For example, a controller may send a signal to a fuel supply valve to increase or decrease a flow rate of fuel toward a faulty prechamber valve (and thus the prechamber). Additionally or alternatively, a prechamber having a faulty prechamber valve may not be utilized (e.g., may be shut off or bypassed), and thus other cylinders of the engine having a working prechamber may compensate for the faulty prechamber valve. As such, an improper combustion event may be avoided, which may, in turn, avoid shutdown of the combustion engine. Shutdown of the combustion engine may be time consuming and costly as a result of lost operating time (e.g., when the combustion engine is shut down, no power is supplied to the load). Therefore, embodiments of the present disclosure monitor operation of the prechamber in real time such that shutdown time of the combustion engine may be decreased to save time and expenses.

Figure 1:
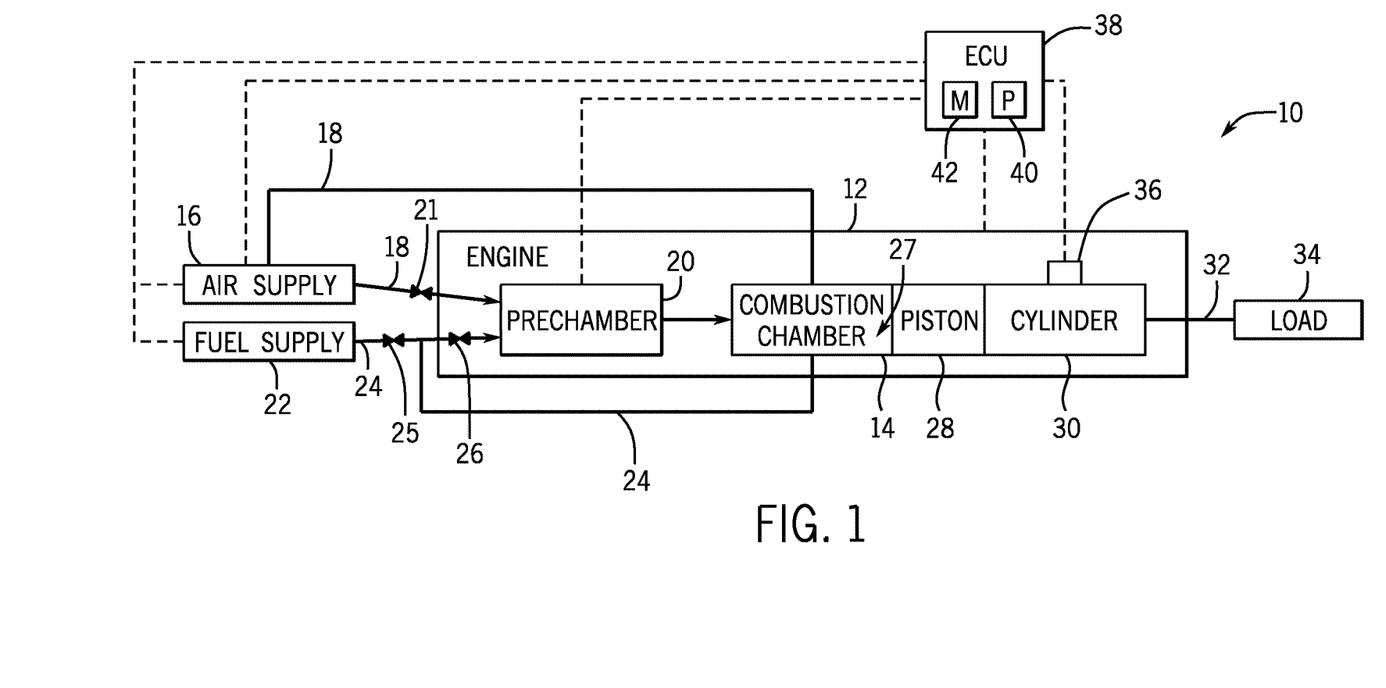
FIG. 1 is a block diagram of an embodiment of a portion of an engine driven power generation system having a reciprocating internal combustion engine.

Turning to the drawings, FIG. 1 illustrates a block diagram of an embodiment of a portion of an engine driven power generation system 10. As described in detail below, the system 10 includes an engine 12 (e.g., a reciprocating internal combustion engine or a spark-ignition engine) having one or more combustion chambers 14 (e.g., 1, 2, 3, 4, 5, 6, 7, 8, 10, 12, 14, 16, 18, 20, or more combustion chambers 14). An oxidant supply 16 (e.g., an air supply) is configured to provide a pressurized oxidant 18, such as air, oxygen, oxygen-enriched air, oxygen-reduced air, or any combination thereof, to a prechamber 20 before directing the oxidant 18 to each combustion chamber 14. A flow of the pressurized oxidant 18 may be adjusted by an oxidant supply valve 21. The prechamber 20 may also be configured to receive, from a fuel supply 22, a fuel 24 (e.g., a liquid and/or gaseous fuel) before the fuel 24 is directed toward each combustion chamber 14. Additionally, a flow of the fuel 24 from the fuel supply 22 may be adjusted by a fuel supply valve 25. As shown in the illustrated embodiment of FIG. 1, the oxidant 18 and the fuel 24 are supplied to the prechamber 20 via separate conduits. However, in other embodiments, the oxidant 18 and the fuel 24 may be mixed prior to entering the prechamber 20. The prechamber 20 may also include a prechamber valve 26 that may receive the fuel 24 and/or the oxidant 18 into the prechamber 20. In certain embodiments, the prechamber valve 26 (e.g., a spring and ball valve, a check valve, or another valve) may enable the fuel 24 and/or the oxidant to enter the prechamber 20, but block the fuel 24 and/or the oxidant 18 from exiting the prechamber 20 and flowing toward the oxidant supply 16 and/or the fuel supply 22.

When the fuel 24 is received by the prechamber 20, the fuel 24 may combust (e.g., via a spark plug or glow plug) within the prechamber 20 to generate a flame. Accordingly, a flame from the prechamber 20 may be directed toward each combustion chamber 14 causing a fuel-air mixture 27 within the combustion chamber to combust. In certain embodiments, the fuel-air mixture 27 in the combustion chamber may be separate from the fuel 24 and the oxidant 18 received by the prechamber 20. In other embodiments, the fuel-air mixture 27 may be received in the combustion chamber 14 via the prechamber 20. In any case, the hot pressurized combustion gases within each combustion chamber 14 cause a piston 28 adjacent to each combustion chamber 14 to move linearly within a cylinder 30 and convert pressure exerted by the gases into a rotating motion, which causes a shaft 32 to rotate. Further, the shaft 32 may be coupled to a load 34, which is powered via rotation of the shaft 32. For example, the load 34 may be any suitable device that may generate power via the rotational output of the system 10, such as an electrical generator. Additionally, although the following discussion refers to air as the oxidant 18, any suitable oxidant may be used with the disclosed embodiments. Similarly, the fuel 24 may be any suitable gaseous fuel, such as natural gas, associated petroleum gas, propane, biogas, sewage gas, landfill gas, coal mine gas, for example. The fuel 18 may also include a variety of liquid fuels, such as gasoline or diesel fuel.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, prechambers 20, pistons 28, and associated cylinders 30 (e.g., 1-24). For example, in certain embodiments, the system 10 may include a large-scale industrial reciprocating engine having 4, 6, 8, 10, 16, 24 or more pistons 28 reciprocating in cylinders 30. In some such cases, the cylinders 30 and/or the pistons 28 may have a diameter of between approximately 13.5-34 centimeters (cm). In some embodiments, the cylinders 30 and/or the pistons 28 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 10 may include one or more knock sensors 36 suitable for detecting engine "knock." The knock sensor 36 may sense vibrations, acoustics, or sound caused by combustion in the engine 12, such as vibrations, acoustics, or sound due to detonation, pre-ignition, and or pinging. Therefore, the knock sensor 36 may include an acoustic or sound sensor, a vibration sensor, or a combination thereof. For example, the knock sensor 36 may include a piezoelectric vibration sensor. The knock sensor 36 may monitor acoustics and/or vibration associated with combustion in the engine 12 to detect a knock condition, e.g., combustion at an unexpected time not during a normal window of time for combustion. The knock sensor 36 is shown communicatively coupled to a control system or controller 38, such as an engine control unit (ECU) 38. During operations, signals from the knock sensor 36 are communicated to the ECU 38 to determine if knocking conditions (e.g., pinging) exist. The ECU 38 may then adjust certain engine 12 parameters to ameliorate or eliminate the knocking conditions. For example, the ECU 38 may adjust ignition timing and/or a flow of fuel 24 directed toward the pre-chamber 20. As shown in the illustrated embodiment of FIG. 1, the ECU 38 may include a processor 40 and a memory 42.

Figure 2:
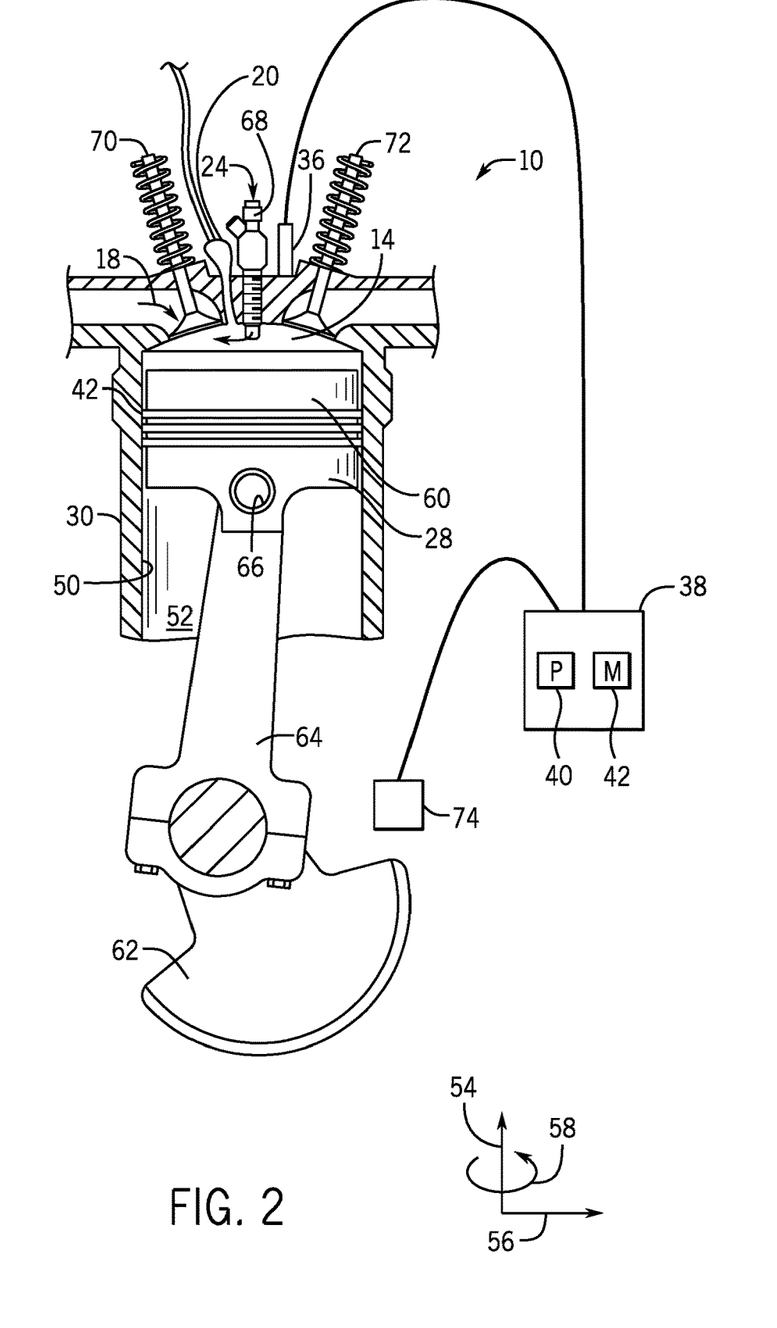
FIG. 2 is a cross-sectional side view of an embodiment of a piston-cylinder assembly having a piston disposed within a cylinder of the reciprocating engine of FIG. 1.

FIG. 2 is a cross-sectional side view of an embodiment of a piston-cylinder assembly having a piston 28 disposed within a cylinder 30 (e.g., an engine cylinder) of the reciprocating engine 12. The cylinder 30 has an inner annular wall 50 defining a cylindrical cavity 52 (e.g., bore). The piston 28 may be defined by an axial axis or direction 54, a radial axis or direction 56, and a circumferential axis or direction 58. The piston 28 includes a top portion 60 (e.g., a top land). The top portion 60 generally blocks the fuel 24 and the air 18, or the fuel-air mixture 27, from escaping from the combustion chamber 14 during reciprocating motion of the piston 28.

As shown, the piston 28 is attached to a crankshaft 62 via a connecting rod 64 and a pin 66. The crankshaft 62 translates the reciprocating linear motion of the piston 28 into a rotating motion. As the piston 28 moves, the crankshaft 62 rotates to power the load 34 (shown in FIG. 1), as discussed above. As shown, the combustion chamber 14 is positioned adjacent to the top land 60 of the piston 28. A fuel injector 68 may provide the fuel 24 to the combustion chamber 14, and an intake valve 70 controls the delivery of oxidant (e.g., air 18) to the combustion chamber 14. Additionally, the prechamber 20 may be configured to introduce a flame into the combustion chamber 14. An exhaust valve 72 controls discharge of exhaust from the engine 12. However, it should be understood that any suitable elements and/or techniques for providing fuel 24 and air 18 to the combustion chamber 14 and/or for discharging exhaust may be utilized, and in some embodiments, no fuel injector 68 is used. In operation, combustion of the fuel 24 with the air 18 in the combustion chamber 14 may cause the piston 28 to move in a reciprocating manner (e.g., back and forth) in the axial direction 54 within the cavity 52 of the cylinder 30.

During operations, when the piston 28 is at the highest point in the cylinder 30 it is in a position called top dead center (TDC). When the piston 28 is at its lowest point in the cylinder 30, it is in a position called bottom dead center (BDC). As the piston 28 moves from TDC to BDC or from BDC to TDC, the crankshaft 62 rotates one half of a revolution. Each movement of the piston 28 from TDC to BDC or from BDC to TDC is called a stroke, and embodiments of the engine 12 may include two-stroke engines, three-stroke engines, four-stroke engines, five-stroke engines, six-stroke engines, or more.

During engine 12 operations, a sequence including an intake process, a compression process, a power process, and an exhaust process typically occurs. The intake process enables a combustible mixture, such as the fuel-air mixture 27, to be pulled into the cylinder 30, thus the intake valve 70 is open and the exhaust valve 72 is closed. The compression process compresses the combustible mixture into a smaller space, so both the intake valve 70 and the exhaust valve 72 are closed. The power process ignites the compressed fuel-air mixture, which may include a spark ignition through a spark plug system, ignition via a glow plug causing the fuel 24 to ignite in the prechamber 20, and/or a compression ignition through compression heat. The resulting pressure from combustion then forces the piston 28 to BDC. The exhaust process typically returns the piston 28 to TDC, while keeping the exhaust valve 72 open. The exhaust process thus expels the spent fuel-air mixture through the exhaust valve 72. It is to be noted that more than one intake valve 70 and exhaust valve 72 may be used per cylinder 30

The depicted engine 12 may include a crankshaft sensor 74, the knock sensor 36, and the engine control unit (ECU) 38, which includes the processor 40 and memory 42. The crankshaft sensor 74 senses the position and/or rotational speed of the crankshaft 62. Accordingly, a crank angle or crank timing information may be derived. That is, when monitoring combustion engines, timing is frequently expressed in terms of crankshaft angle. For example, a full cycle of a four stroke engine 12 may be measured as a 720° cycle. The knock sensor 36 may be a piezoelectric accelerometer, a microelectromechanical system (MEMS) sensor, a Hall effect sensor, a magnetostrictive sensor, and/or any other sensor designed to sense vibration, acceleration, acoustics, sound, and/or movement. In other embodiments, the sensor 36 may not be a knock sensor, but any sensor that may sense vibration, pressure, acceleration, deflection, or movement.

Because of the percussive nature of the engine 12, the knock sensor 36 may be capable of detecting signatures even when mounted on the exterior of the cylinder 30. However, the knock sensor 36 may be disposed at various locations in or about the cylinder 30. Additionally, in some embodiments, a single knock sensor 36 may be shared, for example, with one or more adjacent cylinders 30. In other embodiments, each cylinder may include one or more knock sensors 36. The crankshaft sensor 74 and the knock sensor 36 are shown in electronic communication with the engine control unit (ECU) 38. The ECU 38 includes the processor 40 and the memory 42. The ECU 38 includes non-transitory code or instructions stored in a machine-readable medium (e.g., the memory 42) and used by a processor (e.g., the processor 40) to implement the techniques disclosed herein. The memory 42 may store computer instructions that may be executed by the processor 40. Additionally, the memory 42 may store look-up tables and/or other experimental data relating to normal operating conditions of the engine 12 that may be compared to signals received from the knock sensor 36, the crankshaft sensor 74, and/or other sensors. The ECU 38 monitors and controls the operation of the engine 12, for example, by adjusting combustion timing, timing of opening/closing valves 70 and 72, adjusting the delivery of fuel 24 and oxidant 18 (e.g., air), and so on.

As discussed above, monitoring the prechamber 20 may be desirable to decrease shutdown time of the combustion engine 12. Monitoring the prechamber 20 may be achieved by utilizing the knock sensor 36 and/or other sensors that detect operating conditions associated with combustion in the combustion chamber 14, a condition of the prechamber 20, and/or a condition of the prechamber valve 26. As a non-limiting example, the system 10 may utilize the knock sensor 36 to determine a peak firing pressure within the cylinder 30. The peak firing pressure may be a maximum in-cylinder pressure exerted by the expanding combustion gases on the piston 28 during an expansion stroke. The peak firing pressure may indicate whether combustion in the combustion chamber 14 is occurring at a desired efficiency level (e.g., look-up tables may include a range of desired peak firing pressure values for various operating conditions). When the peak firing pressure value indicates that the combustion process is performing inefficiently (or outside a predetermined range), a flow of fuel injected into the prechamber 20 (e.g., via the fuel supply valve 25) may be adjusted. The knock sensor 36 may send a signal to the ECU 38, which may then adjust the fuel supply valve 25 (e.g., via an actuator or similar device). In other embodiments, the ECU 38 may be coupled to other sensors (in addition to or in lieu of the knock sensor 36) and receive feedback related to a condition of the prechamber 20 and/or the prechamber valve 26 (e.g., whether the valve 26 is stuck and/or clogged).

Figure 3:
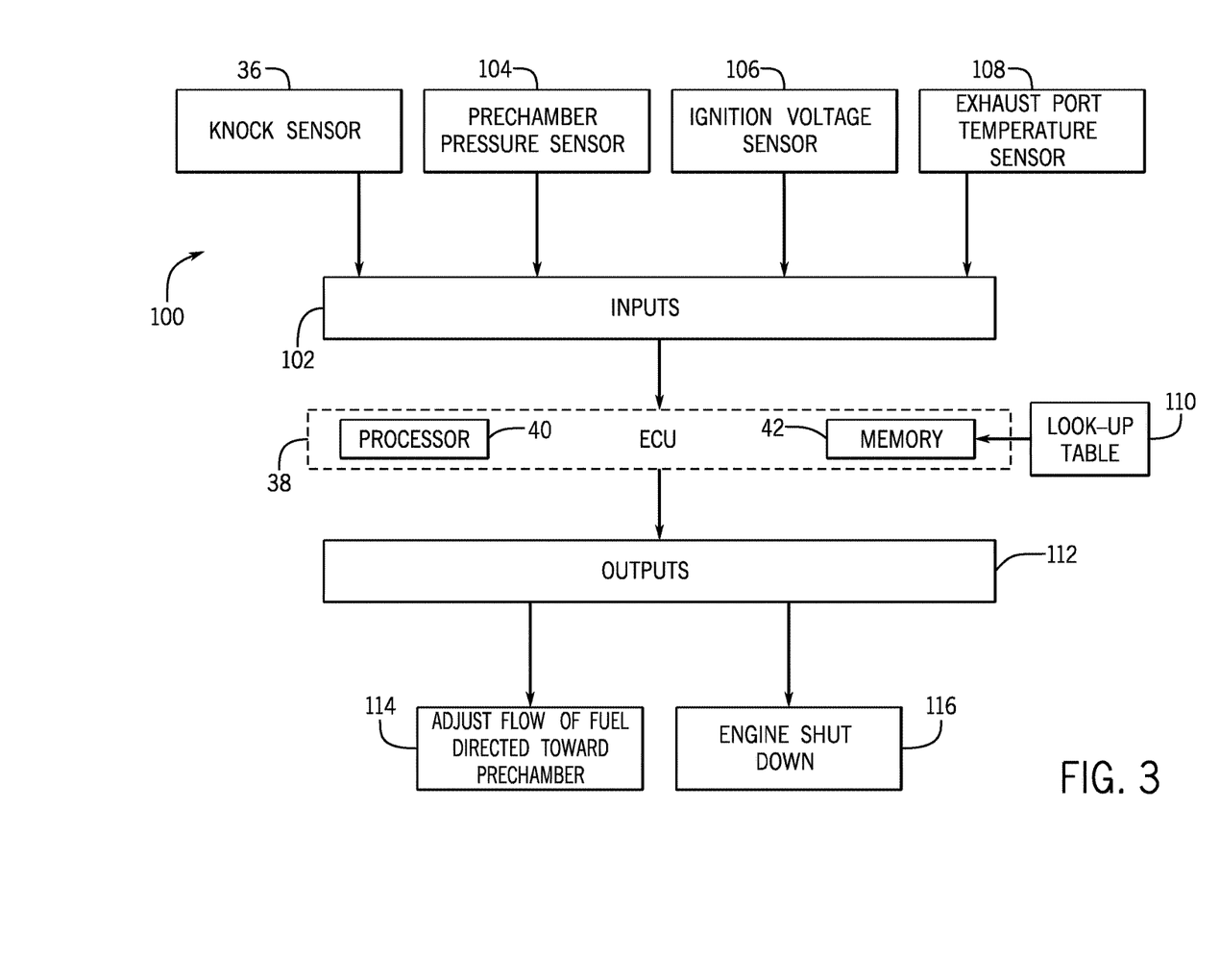
FIG. 3 is a block diagram of an embodiment of an engine control unit of the engine driven power generation system of FIG. 1 receiving inputs and providing outputs.

The ECU 38 may be programmed to monitor the prechamber 20 and to make adjustments in response to feedback associated with operating conditions of the prechamber 20 and/or the prechamber valve 26. For example, FIG. 3 is a block diagram 100 illustrating the ECU 38 of the system 10. As shown in the illustrated embodiment of FIG. 3, the ECU 38 includes the processor 40 and the memory 42. The processor 40 may be configured to perform operations that may prevent shutdown of the combustion engine 12 and/or operations that shutdown the combustion engine 12 when feedback received by the processor 40 is above a threshold value.

In certain embodiments, the ECU 38 may be configured to receive one or more inputs 102. For example, the ECU 38 may be communicatively coupled to the knock sensor 36, a prechamber pressure sensor 104, an ignition voltage sensor 106, an exhaust port temperature sensor 108, another sensor that monitors an operating condition of the prechamber 20 and/or the prechamber valve 26, or any combination thereof. One or more of the sensors 36, 104, 106, and/or 108 may be configured to send feedback to the ECU 38 related to an operating condition of the prechamber 20 and/or the prechamber valve 26.

The knock sensor 36 may be configured to send feedback to the ECU 38 in the form of an acoustic profile, a vibration profile, an acceleration profile, a sound profile, and/or a movement profile. In certain embodiments, the processor 40 of the ECU 38 may utilize the feedback to determine a peak firing pressure within one or more of the cylinders 30 in the engine 12. The peak firing pressure may be indicative of combustion efficiency (e.g., whether the combustion process is operating in a desired range). For example, the memory 42 of the ECU 38 may include a look-up table 110 that includes data related to a desired peak firing pressure range at various operating conditions of the combustion engine 12. Therefore, when the peak firing pressure measured by the knock sensor 36, for example, is outside of the desired peak firing pressure range, the processor 40 may be configured to perform an output 112. In certain embodiments, when the peak firing pressure is outside the desired peak firing pressure range and above a threshold value, the processor 40 may be configured to perform a second output.

The prechamber pressure sensor 104 may be configured to measure a pressure of the fuel 24 and/or oxidant 18 in the prechamber 20. In certain embodiments, the pressure in the prechamber 20 may be indicative of a condition of the prechamber valve 26. As discussed above, the prechamber 20 may include the prechamber valve 26 that directs the fuel 24 and/or oxidant 18 into the prechamber 20. However, in some cases, the prechamber valve 26 may stick (e.g., either in an open position or a closed position) and/or become clogged (e.g., due to contaminants present in the fuel 24). In some embodiments, the processor 40 of the ECU 38 may determine that the prechamber valve 26 is stuck and/or clogged by comparing feedback sent from the prechamber pressure sensor 104 to the look-up table 110, which may include data related to a desired prechamber pressure range over a variety of operating conditions.

Additionally, the ignition voltage sensor 106 may provide the processor 40 with feedback related to a condition of an ignition system of the combustion engine 12. For example, the ignition voltage sensor 106 may be a voltage meter configured to measure a voltage of a spark plug or other device configured to heat a glow plug and generate a flame within the combustion chamber 14 (e.g., in addition to the flame directed to the combustion chamber 14 by the prechamber 20). The voltage of the spark plug or other device configured to heat the glow plug and generate a flame in the combustion chamber 14 may be indicative of an operating condition of the prechamber 20. For example, when the voltage of the spark plug or other device heating the glow plug increases, ignition in the prechamber 20 may be failing and/or occurring at an improper timing. Such an increase in voltage may be associated with a stuck and/or clogged prechamber valve 26. Similar to the feedback received from the knock sensor 36 and/or the prechamber pressure sensor 104, the processor 40 may be configured to compare the feedback from the ignition voltage sensor 106 to the look-up table 110, which may include data related to a desired voltage range of the spark plug or other device heating the glow plug over a variety of operating conditions of the engine 12.

The ECU 38 may also receive feedback from the exhaust port temperature sensor 108. In certain embodiments, the exhaust port temperature sensor 108 may be a thermocouple or other temperature sensor that measures a temperature of the combustion gases exiting the combustion chamber 14 and/or cylinder 30. The temperature of the combustion gases may be indicative of combustion efficiency. For example, a relatively low temperature may be associated with a high pressure in the combustion chamber 20 (or the prechamber 20) and/or a low concentration of the fuel 24 in the fuel-air mixture 27. Again, the processor 40 of the ECU 38 may compare the feedback from the exhaust gas temperature sensor 108 to the look-up table 110, which may include data related to a desired temperature range of combustion gas at a variety of operating conditions of the engine 12.

In certain embodiments, the look-up table 110 may be formed by laboratory test data. For example, a test engine may be operated at a known operating condition (e.g., air/fuel ratio), while other operating conditions are measured using various sensors. Once the test engine reaches a steady state (e.g., the measured operating conditions do not substantially change from one engine cycle to the next), the operating conditions may be recorded and entered into the look-up table 110. The known operating condition may be adjusted to a different known value, and the operating conditions at that different known value may again be recorded. The known operating condition may continue to be adjusted so that the engine 12 operates at all feasible values of the known operating condition. Then, the corresponding operating conditions are recorded at each value of the known operating condition. Such an experiment may be repeated by adjusting a variety of known engine operating conditions such as the air/fuel ratio, in-cylinder temperature, engine rotational speed, intake manifold pressure, crankshaft 62 position, gas fuel pressure, fuel quality, angle of spark firing, and/or spark timing.

When the processor 40 determines that the feedback received from one or more of the sensors 36, 104, 106, and/or 108 is outside of a desired range (e.g., by comparing the feedback to values included in the look-up table 110), the processor 40 may be configured to perform the output 112. In certain embodiments, when the feedback received by the processor 40 from one or more of the sensors 36, 104, 106, and/or 108 is within the desired range(s), no output may be performed by the processor 40.

The output 112 performed by the processor 40 of the ECU 38 may depend at least on the feedback received from one or more of the sensors 36, 104, 106, and/or 108. For example, when the feedback received is outside of the desired range (e.g., when compared to the look-up table 110), the processor 40 may be configured to perform a first output 114, such as adjust a flow of the fuel 24 in the prechamber 20 (e.g., via the fuel supply valve 25). For example, the processor 40 may send a signal to the fuel supply valve 25 to increase or decrease an amount of the fuel 24 delivered to the prechamber 20 based on the feedback. The fuel supply valve 25 may include an actuator, which may adjust a position of the fuel supply valve 25 when the signal is received from the processor 40. The signal to the actuator may open or close the fuel supply valve 25 to increase or decrease the amount of the fuel 24 directed toward the prechamber 20 (and the prechamber valve 26). Adjusting the amount of the fuel 24 directed toward the prechamber 20 may account for issues associated with the prechamber valve 26 (e.g., sticking and/or clogging), and thus, prevent improper combustion within the combustion chamber 14. Accordingly, a shutdown time of the engine 12 may be decreased. As used herein, improper combustion may refer to a combustion process that inefficiently drives the load 34. For example, improper combustion may occur as a result of improper ignition timing (e.g., timing of spark introduction into the combustion chamber), improper fuel concentration, improper in-cylinder pressure, improper fuel quality, and the like.

However, in certain embodiments, improper combustion may not be avoided or mitigated by adjusting the amount of fuel 24 directed toward the prechamber 20. Therefore, the memory 42 of the ECU 38 may include a threshold value (e.g., an upper or lower limit outside of the desired range). Accordingly, when the feedback received by the processor 40 of the ECU 38 exceeds the threshold value, the processor 40 may be configured perform a second output 116, such as directing the engine 12 to shut down. For example, when the peak firing pressure within the cylinder 30 of the engine 12 reaches the threshold value, it may be desirable to completely shut down the engine 12 to avoid permanent damage to the engine 12.

Figure 4:
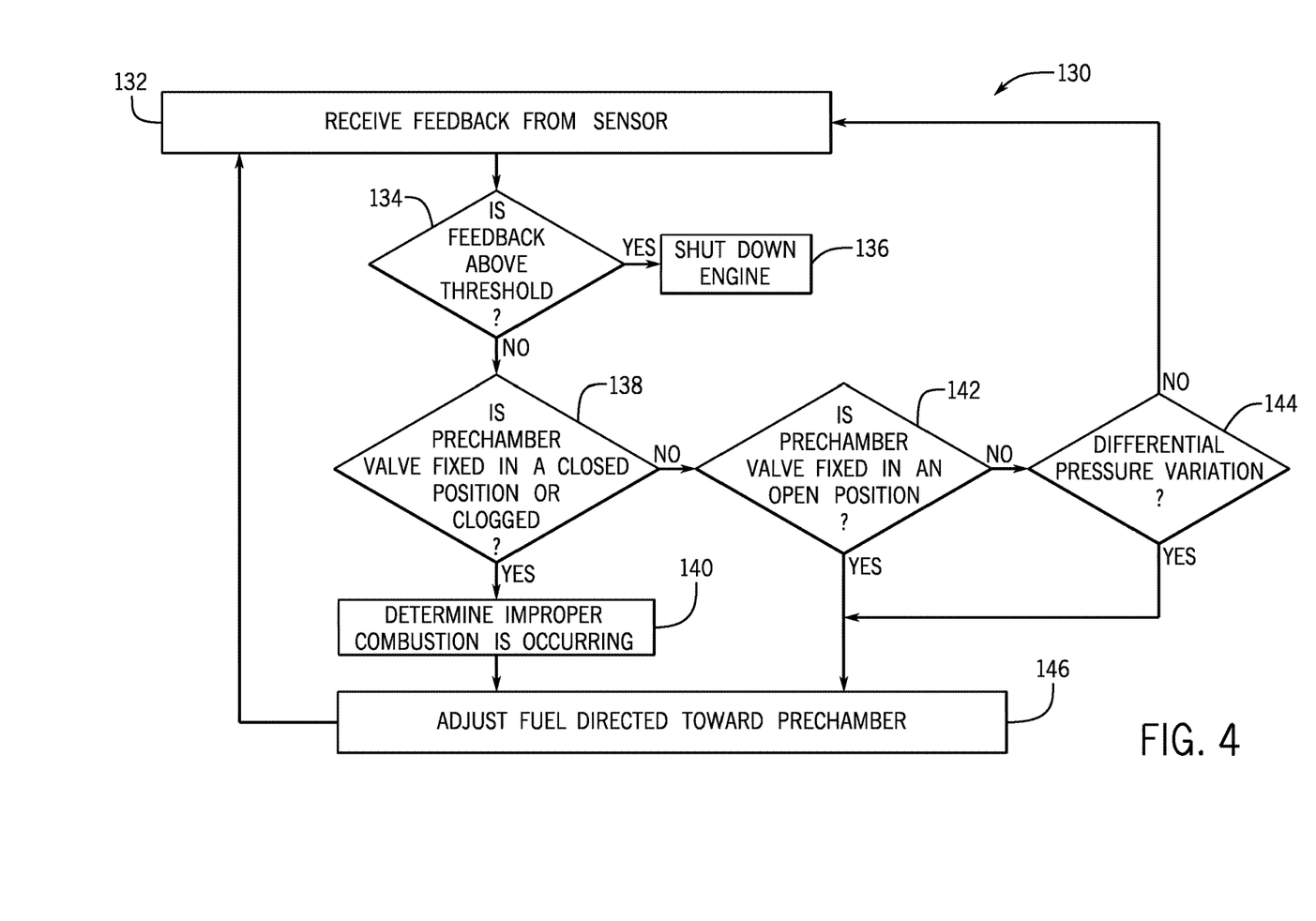
FIG. 4 is a block diagram of a process that may be performed by a processor of the engine control unit of FIG. 3 to monitor a prechamber of the reciprocating internal combustion engine of FIG. 1, in accordance with an aspect of the present disclosure.

In any event, the ECU 38 may be programmed to receive the inputs 102 and perform the outputs 112 to decrease an amount of shutdown time experienced by the engine. For example, FIG. 4 is a block diagram of a process 130 that may be performed by the processor 40 of the ECU 38 to monitor the prechamber 20 and decrease an amount of shutdown time that the engine 12 may incur. For example, at block 132, the processor 40 may receive feedback from the knock sensor 36 (or another sensing component) that includes peak firing pressure data associated with one or more of the cylinders 30. The processor 40 may utilize such data to determine the output to perform (e.g., by comparing the data to the look-up table 110).

As discussed above, the processor 40 of the ECU 38 may also receive feedback from the prechamber pressure sensor 104 related to the pressure of gases within the prechamber 20, the ignition voltage sensor 106 related to the voltage of a spark plug or other device configured to heat the glow plug to generate a flame within the combustion chamber, and/or the exhaust gas temperature sensor 108 related to a temperature of the combustion gases exiting the combustion chamber 14. The processor 40 may also utilize the feedback related to the pressure of the gas in the prechamber 20, the ignition voltage, and/or the temperature of the combustion gases to determine the output to perform (e.g., by comparing the data to the look-up table 110).

In certain embodiments, the processor 40 may utilize feedback from the knock sensor 36, the prechamber pressure sensor 104, the ignition voltage sensor 106, the exhaust gas temperature sensor 108, or any combination thereof to determine the output to perform. For example, the processor 40 may determine the output by weighing the feedback from each of the sensors 36, 104, 106, and 108 (e.g., either equally or not equally).

At block 134, the processor 40 may compare the feedback received from the sensors 36, 104, 106, and/or 108 to data included in the look-up table 110. The processor 40 may determine whether such feedback exceeds a threshold value stored in the memory 42, for example. If the feedback exceeds the threshold value, the processor 40 may send a signal to shut down the engine 12, as shown in block 136.

However, when the feedback is below the threshold value, the processor 40 may determine whether the prechamber valve 26 is fixed (e.g., stuck) in a closed position or whether the prechamber valve 26 is clogged (e.g., by debris or contaminants in the fuel 24), at block 138. In certain embodiments, the processor 40 may determine that the prechamber valve 26 is fixed (e.g., stuck) in the closed position and/or that the prechamber valve 26 is clogged by comparing the feedback received from the sensors 36, 104, 106, and/or 108 to the look-up table 110. For example, the look-up table 110 may include a desired value or desired range of values for the feedback at the operating conditions of the engine 12. Accordingly, when the feedback received is below the threshold value, but outside of the desired value or desired range of values specified in the look-up table 110, the processor 40 may detect that the prechamber valve 26 is fixed in the closed position and/or clogged. As a non-limiting example, when the feedback received by the processor 40 is a pressure in the prechamber 20, the processor 40 may determine that the prechamber valve 26 is fixed in the closed position and/or clogged when such pressure is below a desired pressure range for similar operating conditions, as specified in the look-up table 110.

When the processor 40 determines that the prechamber valve is fixed in a closed position and/or clogged, the processor 40 may detect improper combustion, as shown in block 140. Accordingly, the processor 40 may perform an output (e.g., send a signal to a device in the system 10) to decrease an effect on combustion caused by the prechamber valve 26. The output of the processor 40 may enable the system 10 to avoid shutdown of the engine 12 and/or decrease a shutdown time of the engine 12.

When the processor 40 determines that the prechamber valve 26 is not fixed in a closed position and/or clogged, the processor 40 may determine whether the prechamber valve 26 is fixed (e.g., stuck) in an open position, as shown in block 142. In certain embodiments, the processor 40 may determine that the prechamber valve 26 is fixed (e.g., stuck) in the open position by comparing the feedback received from the sensors 36, 104, 106, and/or 108 to the look-up table 110. As a non-limiting example, when the feedback received by the processor 40 is the pressure in the prechamber 20, the processor 40 may determine that the prechamber valve 26 is fixed in the open position when such pressure is above a desired pressure range for similar operating conditions, as specified in the look-up table 110.

When the processor 40 determines that the prechamber valve 26 is fixed in an open position, the processor 40 may perform an output (e.g., send a signal to a device in the system 10) to decrease an effect on combustion caused by the prechamber valve 26. The output of the processor 40 may enable the system 10 to avoid shutdown of the engine 12 and/or decrease a shutdown time of the engine 12.

Conversely, when the processor 40 determines that the prechamber valve 26 is not fixed in a closed position, clogged, and/or fixed in an open position, the processor 40 may determine whether there is a differential pressure variation between the prechamber 20 and the combustion chamber 14, at block 144. For example, a differential pressure may be monitored between the prechamber 20 and the combustion chamber 14. It may be desirable that the differential pressure between the prechamber 20 and the combustion chamber 14 be substantially constant such that pressure fluctuations between the prechamber 20 and the combustion chamber 14 do not affect combustion. Accordingly, when fluctuations in the pressure differential between the prechamber 20 and the combustion chamber 14 are detected, the processor 40 may perform an output to avoid shutdown of the engine 12 and/or decrease a shutdown time of the engine 12.

In certain embodiments, when the processor 40 determines that the prechamber valve is not in a closed position, clogged, and/or fixed in an open position, and determines that fluctuations in the pressure differential between the prechamber 20 and the combustion chamber 14 are not present, the processor 40 may repeat the process 130 and continue monitoring operation of the prechamber 20. In other words, when no issues related to the prechamber 20 and/or the prechamber valve 26 are detected by the processor 40, the processor 40 may continue the process 130 without performing an output.

At block 146, the processor 40 may perform an output by sending a signal to adjust a flow of the fuel 24 directed toward the prechamber 20 to remedy a detected condition of the prechamber 20 and/or the prechamber valve 26. For example, the processor 40 may send a signal to an actuator that controls an amount of the fuel 24 directed toward the prechamber 20 via the fuel supply valve 25. When the prechamber valve is fixed (e.g., stuck) in the closed position and/or clogged, the processor 40 may send a signal to decrease a flow of the fuel 24 toward the prechamber 20 because the fuel 24 may not be entering the prechamber 20. Accordingly, the processor 40 may also adjust an amount of voltage supplied to the spark plug or other device configured to heat the glow plug that may ignite the fuel-air mixture 27. Supplying more voltage to the spark plug or other device configured to heat the glow plug may ensure that the combustion occurs even without additional heat supplied from the prechamber 20.

Similarly, the processor 40 may also send a signal to the actuator to decrease the flow of the fuel 24 toward the prechamber 20 when the prechamber valve 26 is fixed (e.g., stuck) in an open position. When the prechamber valve 26 is fixed in the open position, more of the fuel 24 may be present in the prechamber 20 than desired. Therefore, a flow of the fuel 24 toward the prechamber 20 may be decreased.

While the illustrated embodiment of FIG. 4 focuses on the output in block 146 as adjusting the flow of the fuel 24 directed toward the prechamber 20, it should be noted that other outputs may be performed by the processor 40. Other outputs that may be performed by the processor 40 include adjusting a concentration of the fuel-air mixture 27 in the combustion chamber, adjusting an ignition timing, discontinuing (e.g., shutting off) operation of the affected prechamber 20 (e.g., the prechamber 20 having a defective prechamber valve 26), any other output that may enable the engine 12 to account for an issue with the prechamber 20 and/or prechamber valve 26, or any combination thereof. In any case, the output performed by the processor 40 may decrease an amount of shutdown time of the engine 12. When the processor 40 performs the output, the process 130 may repeat (e.g., cycle back to block 132) to continue monitoring the prechamber 20.

Technical effects of the disclosed embodiments include a system and method for monitoring a prechamber in a combustion engine to decrease an amount of shutdown time. The prechamber is monitored via one or more sensors that send feedback to a processor of an engine control unit (e.g., a controller). The engine control unit may perform an output, such as adjusting an amount of fuel directed toward the prechamber, in response to the feedback associated with a condition of the prechamber and/or a prechamber valve. The adjustments may enable the combustion engine to continue efficient operation, and thereby reduce engine shutdown time.

This written description uses examples to disclose the subject matter, including the best mode, and also to enable any person skilled in the art to practice the disclosed embodiments, including making and using any devices or systems and performing any incorporated methods. The patentable scope of the disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a combustion engine comprising a first combustion chamber, a second combustion chamber, a first prechamber and a second prechamber, wherein the first prechamber is configured to direct a first flame toward the first combustion chamber, and wherein the second prechamber is configured to direct a second flame toward the second combustion chamber;

a fuel supply valve configured to adjust a flow of a fuel toward the first prechamber, the second prechamber, or both;

a first prechamber valve configured to receive the fuel into the first prechamber;

a knock sensor coupled to the combustion engine; and a controller communicatively coupled to the combustion engine, the first prechamber, the second prechamber, and the knock sensor, wherein the controller is configured to control operations of the combustion engine, to receive a signal from the knock sensor, to determine a combustion parameter based at least on the signal, to determine a condition of one or both of the first prechamber and the first prechamber valve based at least on the combustion parameter, to adjust the fuel supply valve based at least on the condition of the first prechamber, the first prechamber valve, or both, and to adjust the fuel supply valve to direct the fuel toward the second prechamber when the condition of the first prechamber valve indicates that the first prechamber valve is stuck, clogged, or both.

2. The system of claim 1, wherein the combustion parameter comprises a peak firing pressure in a cylinder of the combustion engine.

3. The system of claim 1, wherein the combustion parameter comprises torque output.

4. The system of claim 1, wherein the controller is configured to utilize values of other operating conditions along with the combustion parameter to adjust the amount of fuel injected into the first prechamber.

5. The system of claim 4, wherein the other operating conditions comprise a pressure in the first prechamber, a temperature of gas exhausted from the first combustion chamber, an ignition voltage, or any combination thereof.

6. The system of claim 5, comprising a pressure sensor configured to monitor the pressure in the first prechamber, a temperature sensor to monitor the temperature of the gas exhausted from the first combustion chamber, a voltage meter to measure the ignition voltage, or any combination thereof.

7. The system of claim 1, wherein the second prechamber comprises a second prechamber valve, and wherein the controller is configured to determine an additional condition of second prechamber valve.

8. The system of claim 1, wherein the controller is configured to shutdown the combustion engine when the combustion parameter exceeds a threshold value.

9. A system, comprising:
a controller comprising a processor and a memory, wherein the processor is configured to execute instructions stored on the memory, and wherein the instructions comprise:
receiving data from a knock sensor, wherein the knock sensor is coupled to a combustion engine;
determining a value of an operating condition of the combustion engine based at least on the data;
determining whether the value of the operating condition is outside of a predetermined range;
adjusting a flow of fuel directed toward a first prechamber of the combustion engine via a fuel supply valve when the value is outside of the predetermined range, wherein the first prechamber is configured to direct a flame toward a first combustion chamber of the combustion engine;
adjusting the fuel supply valve to direct the fuel toward a second prechamber of the combustion engine when the value is outside of the predetermined range and indicates that the first prechamber valve is stuck, clogged, or both, wherein the second prechamber of the combustion engine is configured to direct a flame toward a second combustion chamber of the combustion engine; and
outputting a signal to shutdown the combustion engine when the value is outside of the predetermined range and above a threshold.

10. The system of claim 9, wherein the controller is configured to utilize a look-up table to determine whether the value of the operating condition is outside of the predetermined range.

11. The system of claim 9, wherein the operating condition comprises a peak firing pressure in a cylinder of the combustion engine.

12. The system of claim 9, wherein the controller is configured to utilize a pressure in the first prechamber, a temperature of gas exhausted from the first combustion chamber, an ignition voltage, or any combination thereof to adjust the flow of fuel directed toward the first prechamber.

13. The system of claim 12, comprising a pressure sensor to monitor the pressure in the first prechamber, a temperature sensor to monitor the temperature of the gas exhausted from the first combustion chamber, a voltage meter to measure the ignition voltage, or any combination thereof.

14. A method, comprising:
utilizing a controller to:
receive data from a knock sensor, wherein the knock sensor is coupled to a combustion engine;
determine a value of an operating condition of the combustion engine based at least on the data and one of a pressure in the first prechamber, a temperature of gas exhausted from the first combustion chamber, or an ignition voltage;
determine whether the value of the operating condition is outside of a predetermined range;
adjust a flow of fuel directed toward a first prechamber of the combustion engine via a fuel supply valve when the value is outside of the predetermined range, wherein the first prechamber is configured to direct a flame toward a first combustion chamber of the combustion engine;
adjust the fuel supply valve to direct the fuel toward a second prechamber of the combustion engine when the value is outside of the predetermined range and indicates an operational problem of the first prechamber valve, wherein the second prechamber of the combustion engine is configured to direct a flame toward a second combustion chamber of the combustion engine; and
output a signal to shutdown the combustion engine when the value is outside of the predetermined range and above a threshold.

15. The method of claim 14, wherein the operating condition comprises a peak firing pressure in a cylinder of the combustion engine.

16. The method of claim 14, wherein the operational problem of the first prechamber valve comprises the first prechamber valve being stuck, clogged, or both.

* * * * *